United States Patent
Lewis et al.

(10) Patent No.: US 12,179,447 B2
(45) Date of Patent: Dec. 31, 2024

(54) LOCKING HOLE PLUG FOR SEALING HOLES IN COMPOSITE STRUCTURES

(71) Applicant: The Boeing Company, Arlington, VA (US)

(72) Inventors: Melissa H. Lewis, Auburn, WA (US); Arne K. Lewis, Auburn, WA (US); Blake A. Bertrand, Port Orchard, WA (US); Pradeep Krishnaswamy, Redmond, WA (US); Baris Yukseloglu, Marysville, WA (US)

(73) Assignee: THE BOEING COMPANY, Arlington, VA (US)

( * ) Notice: Subject to any disclaimer, the term of this patent is extended or adjusted under 35 U.S.C. 154(b) by 171 days.

(21) Appl. No.: 18/152,537

(22) Filed: Jan. 10, 2023

(65) Prior Publication Data
US 2023/0158759 A1 May 25, 2023

Related U.S. Application Data

(62) Division of application No. 16/049,317, filed on Jul. 30, 2018, now Pat. No. 11,577,479.

(51) Int. Cl.
*B29C 73/10* (2006.01)
*B29C 73/06* (2006.01)
(Continued)

(52) U.S. Cl.
CPC .............. *B29C 73/10* (2013.01); *B29C 73/06* (2013.01); *B29C 73/30* (2013.01); *B32B 3/266* (2013.01);
(Continued)

(58) Field of Classification Search
CPC ..... B29C 73/06; B29C 73/063; B29C 73/066; B29C 73/10; B29C 73/14; B29C 73/30;
(Continued)

(56) References Cited

U.S. PATENT DOCUMENTS

| 4,579,161 A | * | 4/1986 | Roberts | B29C 73/06 |
| | | | | 411/510 |
| 6,814,531 B2 | | 11/2004 | Stevenson et al. | |

(Continued)

FOREIGN PATENT DOCUMENTS

| CN | 102422068 A | 4/2012 |
| CN | 102748347 A | 10/2012 |

(Continued)

OTHER PUBLICATIONS

Notification of Reasons for Rejection mailed Jul. 9, 2024 in corresponding Japanese Application No. 2023-187581, 5 pages (in Japanese and English).

(Continued)

*Primary Examiner* — John L Goff, II
(74) *Attorney, Agent, or Firm* — MH2 Technology Law Group LLP

(57) ABSTRACT

A hole plug that can be used during rework or repair of a composite fiber assembly includes various features that allow placement of a vacuum force to the surface being reworked or repaired. In some implementations, the hole plug can include a plurality of nubs positioned around a shank. The nubs can secure the hole plug to the composite fiber assembly until a cure of an adhesive. The hole plug can further include a plurality of longitudinally oriented grooves extending along the shank and positioned between the plurality of nubs, and can include a notch positioned circumferentially around the shank. The grooves and notch can be used as adhesive carriers that assist with dispersal of a sufficient volume of the adhesive onto other portions of the shank and the composite fiber assembly during insertion of the hole plug into a hole in the composite fiber assembly.

20 Claims, 6 Drawing Sheets

(51) Int. Cl.
*B29C 73/30* (2006.01)
*B32B 3/26* (2006.01)
*B32B 5/26* (2006.01)
B29K 307/04 (2006.01)

(52) U.S. Cl.
CPC ............ *B32B 5/26* (2013.01); *B29K 2307/04* (2013.01); *B32B 2262/106* (2013.01)

(58) Field of Classification Search
CPC ........ B29C 2073/264; B29C 2073/266; B29C 66/00145; B64F 5/40; B29K 2307/04
USPC .................................... 156/94, 98, 285, 286
See application file for complete search history.

(56) References Cited

U.S. PATENT DOCUMENTS

| | | | |
|---|---|---|---|
| 6,988,862 | B1 | 1/2006 | Iguchi et al. |
| 8,617,331 | B2 | 12/2013 | Walsh et al. |
| 9,365,282 | B2 | 6/2016 | Shigetomi et al. |
| 10,710,352 | B2 | 6/2020 | Bertrand et al. |
| 2008/0170928 | A1 | 7/2008 | Stadler et al. |
| 2012/0125534 | A1 | 5/2012 | Watson et al. |
| 2014/0271037 | A1 | 9/2014 | Campbell et al. |
| 2016/0137316 | A1* | 5/2016 | Shigetomi ............... B29C 70/00 73/598 |
| 2016/0186609 | A1 | 6/2016 | Holland et al. |
| 2018/0022046 | A1 | 1/2018 | Tong |
| 2018/0023608 | A1 | 1/2018 | Matsushima |
| 2018/0100528 | A1 | 4/2018 | Ellis et al. |
| 2019/0126562 | A1 | 5/2019 | Mayer et al. |

FOREIGN PATENT DOCUMENTS

| | | | |
|---|---|---|---|
| DE | 102015102174 | A1 | 8/2016 |
| DE | 102017127719 | A1 | 5/2018 |
| JP | H02-50823 | A | 2/1990 |
| JP | 2009503410 | A | 1/2009 |
| JP | 2011126109 | A | 6/2011 |
| JP | 2012225508 | A | 11/2012 |
| JP | 2014100847 | A | 6/2014 |
| JP | 2014114851 | A | 6/2014 |
| JP | 2015183695 | A | 10/2015 |

OTHER PUBLICATIONS

"Requisition by the Examiner" issued Sep. 13, 2022 in corresponding Canadian Application No. 3,044,409, 6 pages.
Office Action issued Mar. 2, 2023 in corresponding Canadian Application No. 3,044,409, 6 pages.
Notice to File a Response issued Oct. 4, 2023 in corresponding Korean Application No. 10-2019-0078502 (in Korean and English), 8 pages.
Extended European Search Report issued Dec. 6, 2019 in corresponding European Application No. 19178786.0, 7 pages.
Examination Report issued Aug. 28, 2020 in corresponding GCC Application No. GC 2019-38003, 9 pages.
Communication pursuant to Article 94(3) EPC issued Oct. 8, 2020 in corresponding European Application 19178786.0, 8 pages.
First Notification of Office Action issued Mar. 16, 2024 in related Chinese application No. 201910548240.8, in English and Chinese, 17 pages.
Requisition by the Examiner in Accordance with Subsection 86(2) of the Patent Rules, issued Jun. 28, 2024 in related Canadian Application No. 3,044,409, 6 pages.
Canadian Office Action issued Sep. 29, 2023 in related Canadian Application No. 3,044,409, 7 pages.
Notification of Reasons for Rejection issued Feb. 21, 2023 in corresponding Japanese Patent Application No. 2019-131550, 8 pages (in Japanese and English).
Wang, Jiayi (SG Authorized Officer), Written Opinion issued on Jul. 6, 2021 in corresponding Singaporean Application No. 10201905843S, 7 pages.
Written Opinion issued Jan. 6, 2023 in corresponding Brazilian Patent Application No. BR102019013423, 8 pages (in Portuguese and English).
Search Report issued Jun. 5, 2020 in corresponding Singaporean Application No. 10201905843S, 5 pages.

* cited by examiner

LOCKING HOLE PLUG FOR SEALING HOLES IN COMPOSITE STRUCTURES

CROSS-REFERENCE TO RELATED APPLICATIONS

This application is a divisional application to U.S. patent application Ser. No. 16/049,317 filed on Jul. 30, 2018, now U.S. Pat. No. 11,577,479, the disclosure of which is hereby incorporated by reference in its entirety.

TECHNICAL FIELD

The present teachings relate to the field of composite structures formed from composite materials and, more particularly, to rework and repair of composite structures.

BACKGROUND

Composite materials such as composite fiber reinforced polymer are commonly used in various industries for their advantages of weight, strength, rigidity, moldability into complex contoured shapes, etc., compared to some other materials. In the aerospace industry, composite fiber reinforced polymers (referred to herein collectively as "carbon composite" for simplicity) are commonly used to form various aircraft structures or portions of structures such as fuselages, wings, empennages, etc. The carbon composite can include multiple layers of carbon fiber sheets laminated together using a resin adhesive, matrix, or binder. To complete a carbon fiber assembly that includes the carbon composite, an outer shell or skin panel (i.e., skin) can be attached with fasteners to an inner frame that can include metal stringers and ribs.

While carbon composites provide a robust strength and durability, rework and/or repair of fatigued, damaged, or other regions or areas is occasionally required. A region to undergo rework may be caused, for example, by physical contact with other objects, gradual wear, material or manufacturing defects, wind damage, lightning strike, chemical damage, fatigue, or other causes. In other cases, the region may result from rework of the structure, for example, from installing additional framework that supports the composite layer. The region may include only surface damage to the skin or may extend further into the carbon composite.

In some cases, depending on surrounding structures, the composite resin can be reworked or repaired by removing the damaged area, applying a fiber patch and an epoxy resin with a curing agent, curing the resin, then sanding and finishing the fiber patch and surrounding areas to complete the repair. Generally, a vacuum force is applied to the fiber patch during the resin cure to compact the two or more fiber layers that make up the fiber patch by removing air and volatile gases from within and between the laminated layers, and to remove excess resin.

Improved structures, methods, and kits for repairing composite structures would be a welcome addition to the art.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, a hole plug includes a flange having a first diameter, wherein the flange is positioned at a first end of the hole plug, a bevel extending from, and intersecting, the flange at an angle, a shank extending from the bevel away from the flange to a second end of the hole plug opposite the first end, the shank including a second diameter that is smaller than the first diameter and a plurality of longitudinal grooves defined by the shank and oriented around an exterior of the shank. The hole plug further includes a plurality of nubs positioned on, and extending from, the exterior of the shank, wherein the plurality of nubs are positioned between the plurality of longitudinal grooves.

Optionally, the plurality of nubs each include a radius and a tangent of each radius parallel to a longitudinal axis of the hole plug intersects the flange within the first diameter. The hole plug can further include a circumferential notch defined by the shank, wherein the circumferential notch is positioned between the plurality of longitudinal grooves and the flange. The plurality of nubs can each include a first height that is parallel to a longitudinal axis of the hole plug. The plurality of longitudinal grooves each have a second height that is parallel to the longitudinal axis of the hole plug and greater than the first height, and the plurality of longitudinal grooves can be positioned closer to the first end and the second end of the hole plug than the plurality of nubs. The second end of the hole plug can include a chamfered surface, and the plurality of longitudinal grooves can extend into the chamfered surface.

Additionally each nub can define a radius, such that the plurality of nubs define a plurality of radii. Each radius can include a tangent that is parallel to a longitudinal axis of the hole plug, and each tangent of each radius intersects the flange within the first diameter.

In an implementation, the hole plug can have a third diameter through a first nub, through the shank, and through a second nub that is opposite the first nub, and the third diameter can be less than the first diameter and greater than the second diameter. The hole plug can be formed from a single piece of material, and the single piece of material can be maraging steel. The hole plug can have a surface roughness, wherein an average roughness centerline "$R_a$" of the surface roughness is from 250 microns (μm) to 400 μm. Further, In another implementation of the present teachings, a composite fiber assembly includes a composite laminate and a skin overlying the composite laminate, the composite laminate and the skin having a hole therethrough, wherein a first diameter of the hole through the skin is larger than a second diameter of the hole through the composite laminate. The composite fiber assembly further includes a hole plug within the hole, the hole plug having a flange having a third diameter, wherein the flange is positioned at a first end of the hole plug, a bevel extending from, and intersecting, the flange at an angle, a shank extending from the bevel away from the flange to a second end of the hole plug opposite the first end. The shank includes a fourth diameter that is smaller than the third diameter and a plurality of longitudinal grooves defined by the shank and oriented around an exterior of the shank. The hole plug further includes a plurality of nubs positioned on, and extending from, the exterior of the shank, wherein the plurality of nubs are positioned between the plurality of longitudinal grooves, and wherein the composite laminate physically contacts the hole plug between the flange and the plurality of nubs.

Optionally, the plurality of nubs each comprise a radius and a tangent of each radius parallel to a longitudinal axis of the hole plug intersects the flange within the third diameter. The hole plug can further include a circumferential notch defined by the shank and the circumferential notch is positioned between the plurality of longitudinal grooves and the flange. The plurality of nubs can have a first height that is parallel to a longitudinal axis of the hole plug, the plurality of longitudinal grooves can each have a second height that is parallel to the longitudinal axis of the hole plug and greater than the first height, and the plurality of longitudinal grooves can be positioned closer to the first end and the second end of the hole plug than the plurality of nubs. The hole plug can further include a chamfered surface at the second end, wherein the plurality of longitudinal grooves extend into the chamfered surface.

Another implementation of the present teachings includes a method for reworking a region of a composite resin assembly having a composite laminate and a skin overlying the composite laminate. The method includes defining a hole within the region of the composite resin assembly, wherein the hole comprises a first diameter within the skin and a second diameter within the composite laminate, and the first diameter is larger than the second diameter, applying an adhesive to a plurality of grooves defined by a shank of a hole plug, fully inserting the hole plug into the hole, wherein the hole plug is recessed within the skin, curing the adhesive, and subsequent to curing the adhesive, completing the reworking of the region. The completing of the reworking of the region can optionally include applying a vacuum bag to the region subsequent to curing the adhesive and applying a vacuum force to the region and to the hole plug. The applying of the vacuum force to the region can debulk one or more repair layers overlying the hole plug. The method can further include forming a cant on the composite laminate, partially inserting the hole plug into the hole, wherein nubs extending from the shank of the hole plug rest on the cant, and applying the adhesive to a notch that encircles the shank of the hole plug.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Wherever convenient, the same reference numbers will be used throughout the drawings to refer to the same or like parts. It will be understood that the structures referenced herein may include additional features which are not depicted for simplicity, while various depicted structures may be removed or modified.

As discussed above, a vacuum force can be applied to a surface area during repair of a carbon composite. The vacuum force debulks the two or more fiber layers by removing air and volatile gases from within and between the laminated layers, and removes excess resin.

As discussed above, some structures can include a carbon composite covered by a hard skin panel to form a composite fiber assembly. The composite fiber assembly can include a pair of adjacent or parallel surfaces that form a hollow area or gap between the adjacent surfaces. This construction can impede or prevent access to the back side of the surface undergoing repair or rework (i.e., the repair surface). When this hollow area has a high volume or is open to the inflow of air or other gases, a vacuum force on the repair surface during the cure of the repair patch can be difficult or impossible to establish and, if applied, can result in the repair patch lifting away from the repair surface.

The present teachings thus include a hole plug that can be positioned through the laminated layers of the carbon composite. The hole plug fills the opening through the carbon composite and simplifies the repair of the structure.

Figure 1:
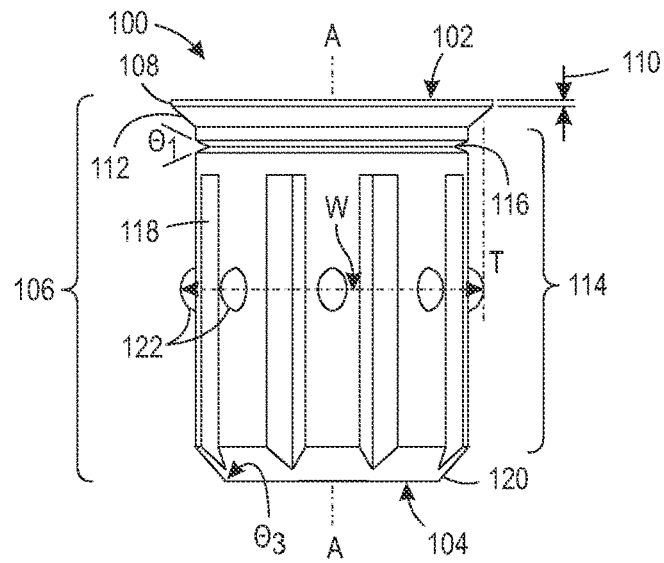
FIG. 1 is a side view of a hole plug in accordance with an implementation of the present teachings.
Figure 2:
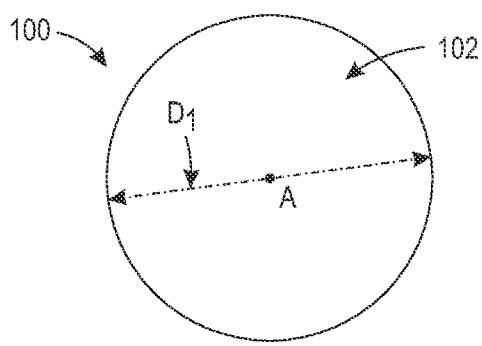
FIG. 2 is a plan view or top view of the hole plug of FIG. 1.
Figure 3:
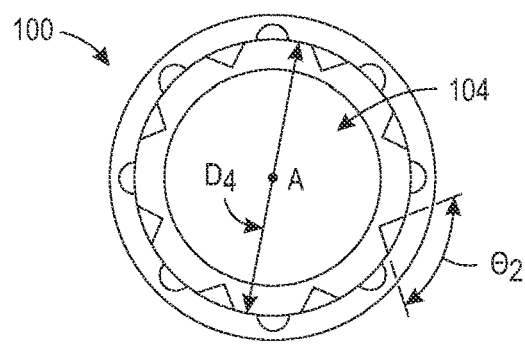
FIG. 3 is a bottom view of the hole plug of FIG. 1.

FIG. 1 is a side view, FIG. 2 is a bottom view, and FIG. 3 is a top view of a hole plug 100 in accordance with an example implementation of the present teachings. The hole plug design includes various features for use with carbon composites such as multilayer carbon fiber resin structures as described below. It will be appreciated that the hole plug 100 depicted in the figures is an exemplary implementation, and that other implementations may include other features that have not been depicted for simplicity, while various depicted features may be removed or modified.

The hole plug 100 in the implementation of FIG. 1 includes a first or upper surface 102 at a first end of the hole plug 100, a second or lower surface 104 at a second end of the hole plug 100, and a body 106 positioned between the upper surface 102 and the lower surface 104 (i.e., between the first end and the second end). The upper 102 and lower 104 surfaces can be planar or generally planar, and parallel or generally parallel with each other. The body 106 includes a flange 108 that can intersect the upper surface 102 at an angle of about 90°±5° and has a thickness 110. The body 106 further includes a bevel 112 that intersects the flange 108 and a shank 114 that intersects the bevel 112. The bevel 112 can have an angle of about 100°±5° relative to a longitudinal axis A that extends through a center of the hole plug 100, or another angle that matches a countersink of the hole it is being used to fill as described in more detail below. A bevel 112 with an angle of less than 95° or greater than 105° can result in a poor adhesive bond with the carbon fiber laminate, and may result in leakage of air around the hole plug 100 upon the application of a vacuum during use. The shank 114 can be generally parallel with the longitudinal axis A.

The shank 114 defines a notch 116 that can encircle an entirety of the shank 114 around the longitudinal axis A, thus providing a circumferential notch. Two linear edges of the notch 116 can intersect to form an angle theta 1 ($\theta_1$) of about 45°±5°. The shank 114 further defines, at least in part, a plurality of grooves 118. Each groove 118 has a height that is parallel to the longitudinal axis A and a width that is perpendicular to the longitudinal axis A, where the height is greater than the width, and thus form longitudinal grooves 118. The plurality of grooves 118 extend along a majority of the shank 114 parallel to the longitudinal axis A. Further, the plurality of grooves 118 extend into a chamfered surface 120 or chamfer 120, and thus the chamfer 120 defines a portion of each of the plurality of grooves 118. FIG. 3 depicts eight grooves 118 generally equally spaced around the circumference of the hole plug 100, and thus a center of each groove 118 is spaced from each of two adjacent grooves 118 by 45° around the circumference of the hole plug 100. Two linear edges of each groove 118 can intersect to form an angle theta 2 ($\theta_2$) of about 97.2°±5°.

The hole plug 100 further includes a plurality of locking detents, bumps, retention members, or nubs 122 (hereinafter, collectively, "nubs") that extend from the shank 114. FIGS. 1 and 3 depict one nub 122 positioned between each pair of adjacent grooves 118. The nubs 122 are generally equally spaced around the circumference of the hole plug 100, and thus a center of each nub 122 is spaced from each of two adjacent nubs by 45° around the circumference of the hole plug 100. Each nub 122 can include, for example, a spherical sector, a spherical slice, a hemisphere, etc., having a radius, such that the plurality of nubs define a plurality of radii. As depicted in FIG. 1, a tangent T of the radius of each nub 122 that is parallel to the longitudinal axis A intersects the bevel 112 within an outside diameter $D_1$ (FIG. 2) of the flange 108. In another aspect, a width W of the hole plug 100 through the longitudinal axis A and through a pair of nubs 122 that are positioned on opposite sides of the shank 114 is less than the outside diameter $D_1$ of the flange 108. Additionally, a circumference of the hole plug 100 around a midpoint of the nubs 122 (generally circumferentially around width "W" in FIG. 1) is less than a circumference of the hole plug 100 around the outer vertical surface of the flange 108. Moreover, an outside diameter $D_4$ (FIG. 3) of the shank 114 is less than the outside diameter $D_1$ of the flange 108.

The midpoint of the nubs 122 depicted at the width W in FIG. 1 should be the approximate middle of the hole plug 100 between upper surface 102 and lower surface 104. In this aspect, "W" in FIG. 1 refers to the middle or midpoint of the hole plug 100, where 50% of an overall height of the hole plug 100 is above midpoint W and 50% of the overall height of the hole plug 100 is below midpoint W. As depicted, the plurality of grooves 118 are positioned closer to the first surface 102 at the first end and to the second surface 104 at the second end of the hole plug than are the plurality of nubs 122, which aids in dispersing a sealant (e.g., adhesive) as described below.

The surface of the chamfer 120 intersects the surface of the shank 114 and the lower surface 104 as depicted in FIG. 1, and forms an angle theta 3 ($\theta_3$) with the lower surface 104. The angle $\theta_3$ can be about 131°±5°.

With regard to use, the hole plug 100 can be designed so that the diameter $D_1$ of the flange 108 (e.g., the diameter $D_1$ of the upper surface 102) is larger than the minimum diameter of the hole for which it is used (i.e., the hole through the carbon fiber resin laminate) and smaller than the largest diameter of the hole through the exterior surface (i.e., the hole through the exterior skin) of the composite fiber assembly. Further, the thickness 110 of the flange 108 must have a sufficient thickness to withstand the loads and/or forces that it will undergo during installation as described below. The bevel 112 (e.g., the angle and height of the bevel 112) is designed to match a countersink of the hole for which it is designed.

The notch 116 can be included to facilitate bonding at an interface of the bottom of the skin. The notch 116 provides an additional adhesive carrier or receptacle that at least partially attaches the hole plug 100 to the carbon fiber laminate. Similarly, grooves 118 running parallel to the shank 114 and to the longitudinal axis A are designed as an additional adhesive carrier or receptacle for attachment to the carbon fiber laminate. Both the notch 116 and grooves 118 can also provide some frictional resistance to maintain the hole plug 100 in place prior to curing of the adhesive. The grooves 118 should extend both above and below the nubs 122 so that the adhesive is carried through the length of the hole that receives the hole plug 100.

The nubs 122 are sized to be sufficiently large to maintain the hole plug 100 within the hole in the carbon fiber laminate but small enough to prevent damaged to the carbon fiber laminate as they pass through the hole. The length of the chamfer 120 and the angle $\theta_3$ of the chamfer are designed to ease installation of the hole plug 100 into the hole in the carbon fiber assembly during repair. A minimum length of the body 106 (i.e., the total length of the hole plug 100) is designed for ease of installation of the hole plug 100, but also helps prevent the nubs 122 from breaking or fracturing off of the shank 114 during installation.

A surface roughness of the hole plug 100 contributes to the mechanical bond of the adhesive to the hole plug 100. In an implementation, the hole plug 100 can have a surface roughness, wherein an average roughness centerline "Ra" of the surface roughness is from 250 microns (µm) to 400 µm.

The hole plug 100 can be formed, for example, using an additive manufacturing process such as a three dimensional (3D) printing process. The 3D printing process can include laser sintering of a metal or metal alloy, such as maraging steel. In another manufacturing process, the hole plug 100 can be formed using a molding process of a metal, metal alloy, or a suitable synthetic such as a polymer. The hole plug 100 can be formed as a single solid structure or single piece of material, although other constructions, such as formation from two or more materials or layers, or the formation of a hollow hole plug 100 to reduce weight, are contemplated. The surface roughness described above can result form the 3D printing process, molding process, or another formation process, or can result from a separate method act such as one or more of chemical etching, mechanical etching, or chemical-mechanical etching.

Figure 4:
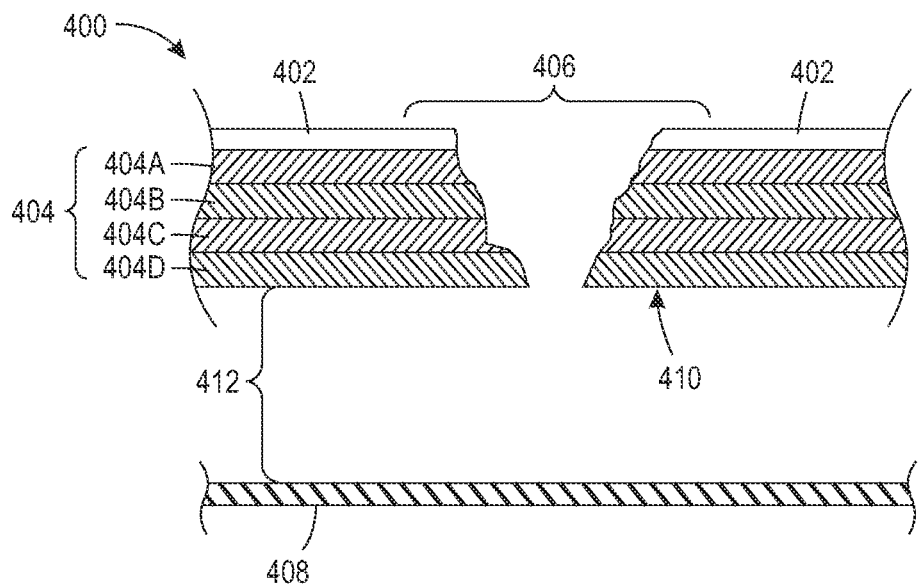
FIG. 4 is a cross section of a composite fiber assembly having a area for repair or rework.

Various uses and techniques for using the hole plug 100 in accordance are contemplated. An example use is depicted in FIGS. 4-9. FIG. 4 is a cross section depicting a composite resin assembly 400 (e.g., a carbon fiber assembly 400) including a rigid outer layer or skin 402 and a carbon fiber laminate 404. The carbon fiber laminate 404 of FIG. 4 includes four carbon fiber layers 404A-404D, but it will be appreciated that a carbon fiber laminate can include two or more carbon fiber layers, and may include 100 or more layers. The carbon fiber assembly 400 includes a region 406 to undergo rework or repair (hereinafter, generally referred to collectively as rework). The region 406 to undergo rework may result from damage, maintenance, reconstruction, or reinforcing of the carbon fiber assembly, or any another cause. For purposes of illustration, FIG. 4 further depicts a surface or layer 408 that prevents access to the back surface 410 of the carbon fiber laminate 404, where the back surface 410 and the layer 408 are separated by a gap 412. Access to the back surface 410 is typically required to properly establish a vacuum from the skin 402 side of the carbon fiber assembly 400. The layer 408 may include a plurality of layers and may be part of the carbon fiber assembly 400 or another surface.

Figure 5:
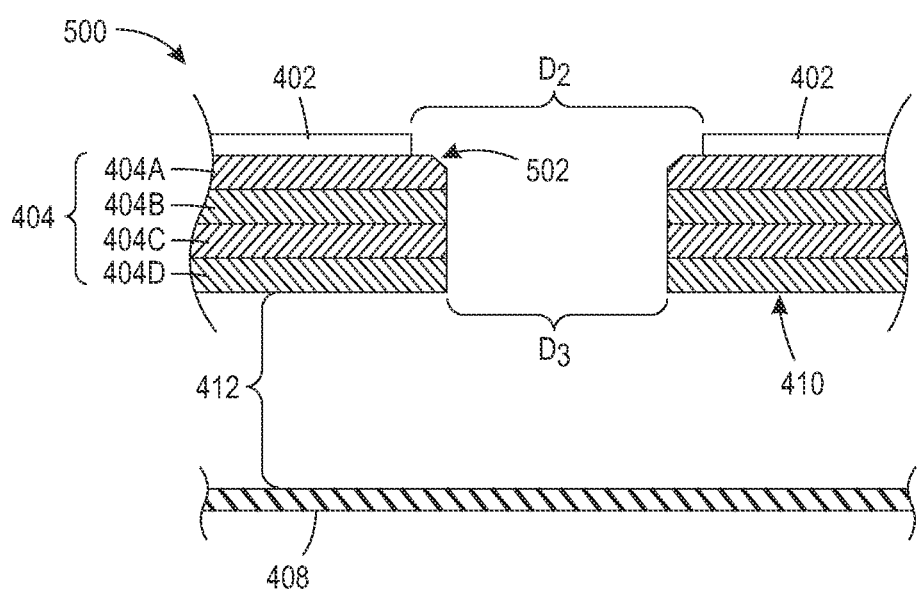
FIG. 5 depicts the FIG. 4 structure after forming or shaping a hole therethrough.

FIG. 5 depicts the FIG. 4 structure after forming or shaping a hole 500 through the skin 402 and carbon fiber laminate 404 of the carbon fiber assembly 400. As depicted, the portion of the hole 500 through the skin 402 has a larger diameter $D_2$ than the diameter $D_1$ of the surface 102 of the flange 108 (FIG. 2) of the hole plug 100. Further $D_2$ is larger than a diameter $D_3$ of the portion of the hole 500 through the carbon fiber laminate 404. Further, the carbon fiber laminate 404 around the hole 500 can include a sloping face 502 (i.e., cant 502) that forms a countersink for the hole 500, where the cant 502 approximates or matches the bevel 112 of the hole plug 100. The hole 500 can be formed using, for example, a drill bit and countersink tool known in the art (not individually depicted for simplicity).

Figure 6:
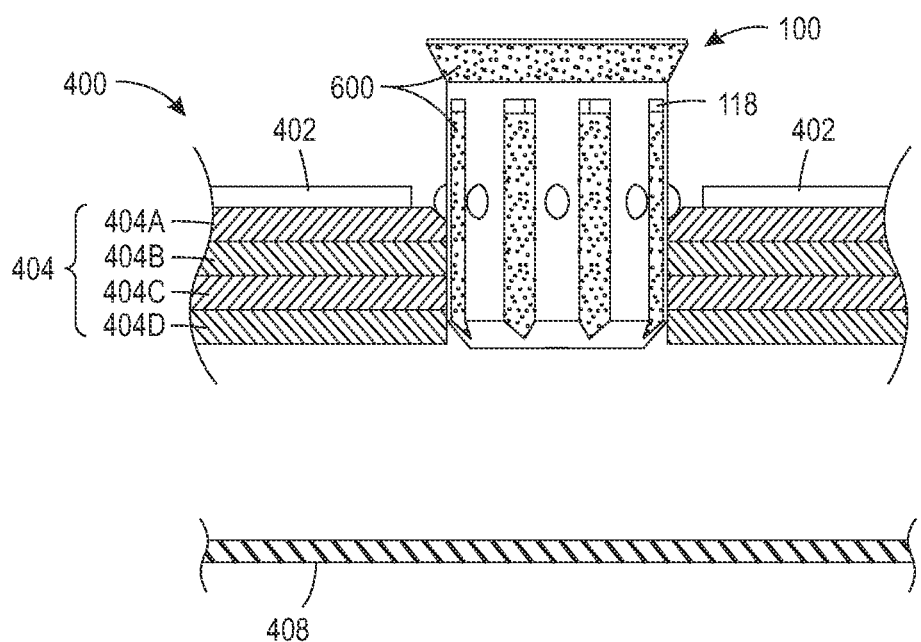
FIG. 6 depicts the FIG. 5 structure after partially inserting a hole plug into the hole.
Figure 7:
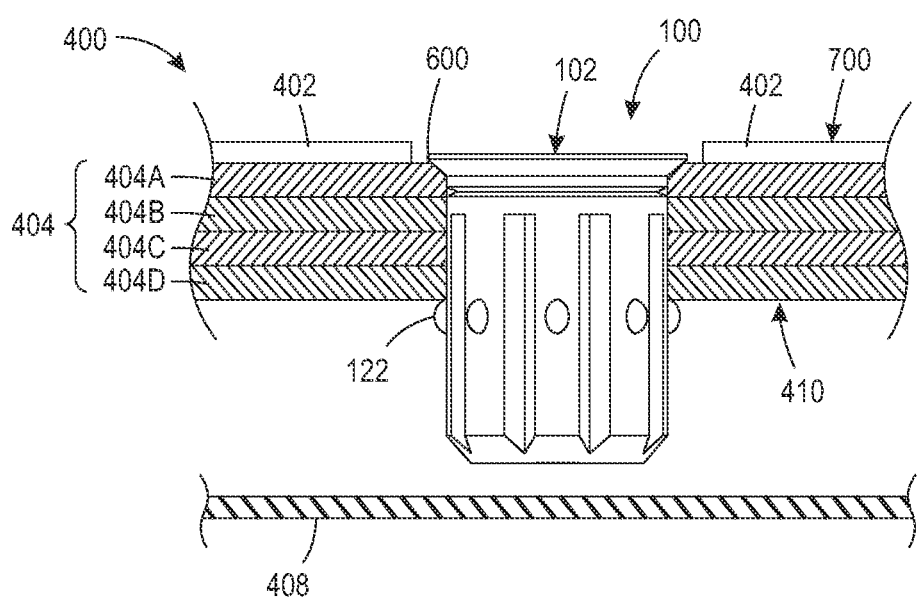
FIG. 7 depicts the FIG. 6 structure after fully inserting the hole plug into the hole.

The measurements of the FIG. 4 structure, particularly the carbon fiber assembly 400 and the hole 500 therethrough, can be used to determine the shape of the hole plug 100 used for the rework. In one implementation, the hole plug 100 can be formed by 3D printing after forming the hole 500. In another implementation, the hole plug 100 can be formed prior to forming the hole 500, where the hole 500 is shaped to match the hole plug 100. After forming the shaped hole 500 and the hole plug 100, an adhesive material 600 can be applied to the grooves 118 of the hole plug 100. The hole plug can then be placed either completely into the hole 500 as depicted in FIG. 7, or partially into the hole 500 as depicted in FIG. 6. In the position of FIG. 6, the elongated portion of the shank 114 below the nubs 122 stabilize the hole plug 100 within the hole in the carbon fiber laminate 404. In the position of FIG. 6, additional adhesive 600 can be placed around the hole plug 100, for example, around and/or into the notch 116, after which the hole plug 100 is inserted fully into the hole 500 as depicted in FIG. 7. Excessive adhesive is removed to result in a structure similar to FIG. 7.

As depicted in FIG. 7, the hole plug 100 is designed so that the tops of the nubs 122 (i.e., the upper edges between surface 102 and the midpoint W, FIG. 1) are positioned at or near the level of the back surface 410. The nubs 122 thus prevent the hole plug 100 from falling or popping out of the hole 500 prior to the curing of the adhesive 600, even under the force of gravity or the application of a certain amount of vacuum force. In one aspect, the nubs 122 loosely secure or "lock" the hole plug 100 onto the composite laminate 404, possibly in the absence of cured or uncured adhesive or other discrete mechanical attachments, and thus can be referred to as a "locking" hole plug. Further, the upper surface 102 of the hole plug 100 is at a level that is below the exposed upper surface 700 of the skin 402 so that the rework region 406 can be continuous and level with the exposed upper surface 700 after completion of the rework. The elongated portion of the shank 114 between the bottom of the nubs 122 and the chamfer 120 ensures that a sufficient amount or volume of adhesive is carried within the grooves 118 by the hole plug 100 through the hole in the carbon fiber laminate 404 and to the back surface 410 to properly bond the hole plug 100 to the carbon fiber laminate 404. After forming the FIG. 7 structure, the adhesive 600 is cured, thereby bonding the hole plug 100 to the carbon fiber layers 404A-404D of the carbon fiber laminate 404.

Figure 8:
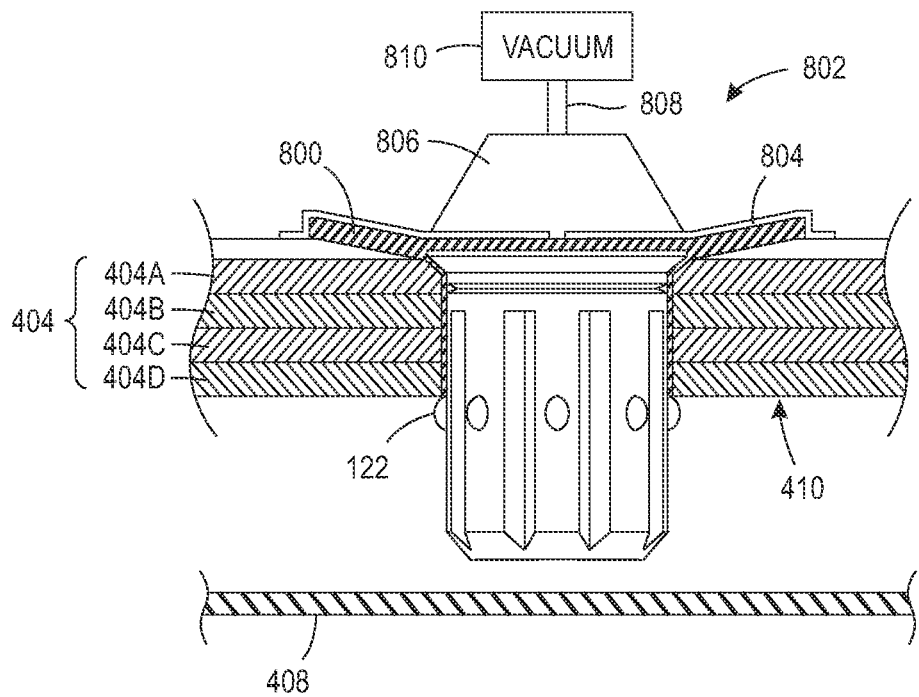
FIG. 8 depicts the FIG. 7 structure during repair or rework.

Subsequently, additional processing can be performed to rework the region 406 that includes the hole plug 100. The rework can include applying one or more repair layers 800 to the region 406 as depicted in FIG. 8. A vacuum assembly 802, which may include a vacuum bag 804, a vacuum nozzle 806, and a vacuum line 808 connected to a vacuum 810 can be applied to the region 406. The vacuum assembly 802 may be used to debulk the one or more repair layers 800, and to remove excess resin as the one or more repair layers 800 are cured. After curing the one or more repair layers 800, the vacuum assembly 802 is removed from the upper exposed surface 700 of the skin 402, and additional processing is performed on the repair layer 800 and skin 402 to result in the completed structure of FIG. 9. The hole plug 100 thus remains part of the carbon fiber assembly 400.

Figure 9:
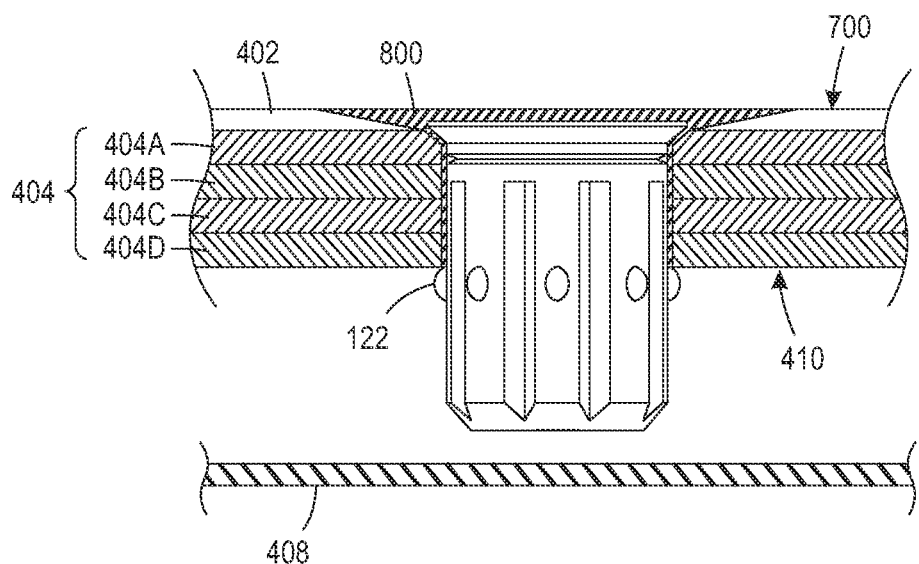
FIG. 9 depicts the FIG. 8 structure after completing the repair or rework.
Figure 10:
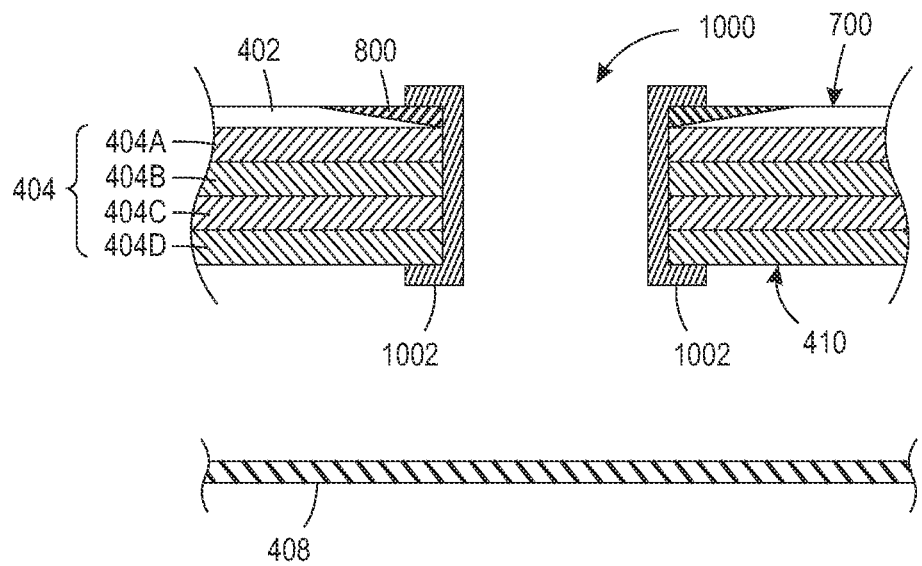
FIG. 10 depicts the FIG. 9 structure after drilling out the hole plug and lining a resulting fastening hole with a liner.

With regard to the structure depicted in FIGS. 4-9, the region 406 to undergo rework or repair may be a solid surface such that the structure of FIG. 9 is completed. In another implementation, the region 406 of FIG. 4 can be or include a damaged region around a fastening hole. In this implementation, the fastening hole can be temporarily filled and sealed using the hole plug 100 and repaired as described above with reference to FIGS. 4-8 result in the structure of FIG. 9. Subsequently, the structure of FIG. 9 can be further processed, for example, by drilling out and/or otherwise removing the hole plug 100 to result in the fastening hole 1000 of FIG. 10. In an implementation, the fastening hole 1000 can be lined with a liner 1002, for example, to protect the carbon fiber laminate 404 or to prepare the fastening hole 1000 for insertion of a fastener (not individually depicted for simplicity).

It will be appreciated that the figures have been simplified and are drawn to facilitate understanding of the present teachings and are not to scale.

Figure 11:
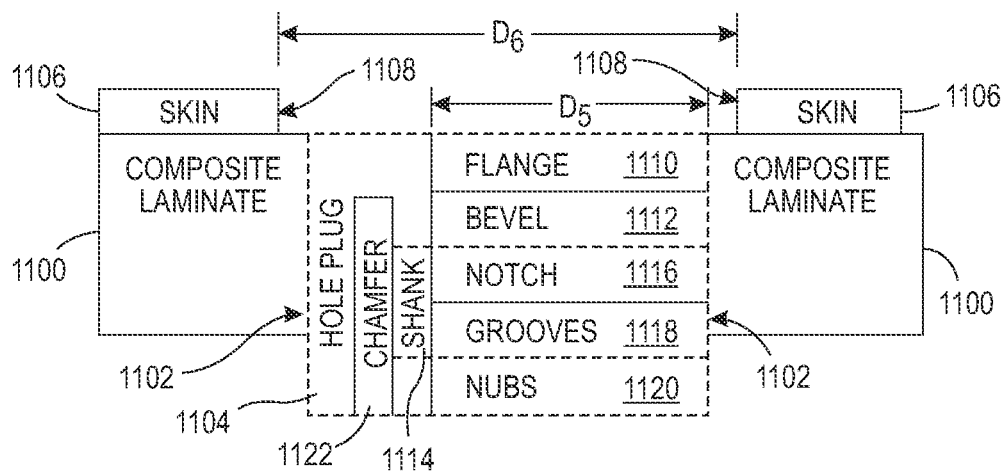
FIG. 11 is a functional block diagram depicting a hole plug within a hole of a composite laminate.

FIG. 11 is a functional block diagram depicting a composite laminate 1100 having a first hole 1102 therethrough, and a hole plug 1104 positioned within the first hole 1102. The composite laminate 1100 can be or include one or more layers, for example, one or more carbon fiber layers. The FIG. 11 structure further depicts a skin 1106 that can be a solid shell that overlies and covers the composite laminate 1100. The skin 1106 can have a second hole 1108 therethrough. The hole plug 1104 can be inserted through the second hole 1108 to result in the positioning of the hole plug 100 within the first hole 1102. A first width or first diameter $D_5$ of the first hole 1102 is smaller than a second width or second diameter $D_6$ of the second hole 1108. The hole plug 1104 of FIG. 10 includes a flange 1110, a bevel 1112 extending from the flange 1110, and a shank 1114 extending from the bevel 1112. The shank 1114 can include a notch 1116 that can extend partially or completely around a circumference of the shank 1114. The shank 1114 further includes a plurality of grooves 1118 extending longitudinally along a height of the shank 1114. A plurality of nubs 1120 and a chamfer 1122 extend from the shank 1114.

Figure 12:
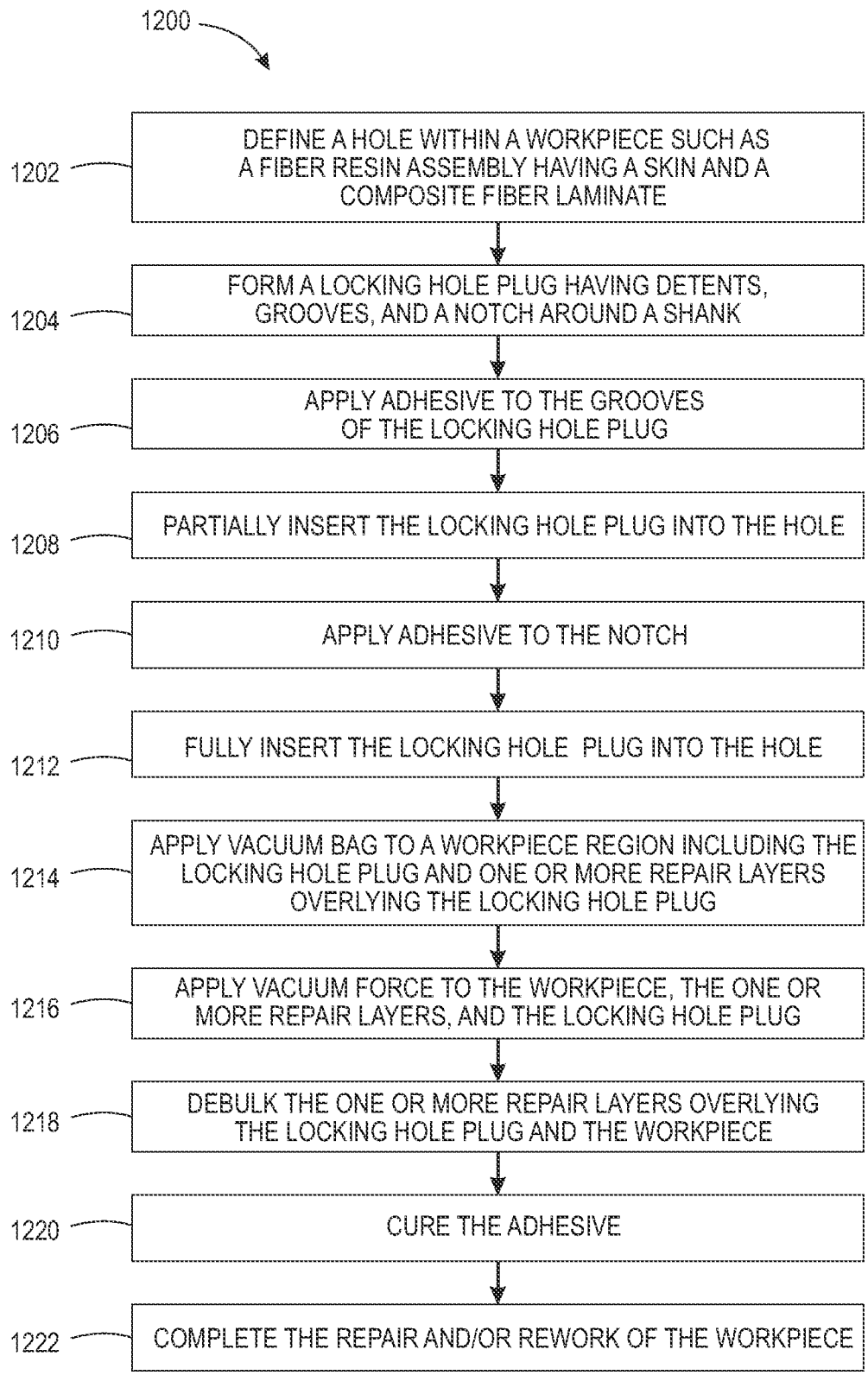
FIG. 12 is a flow chart of a method for repairing or reworking a workpiece.

FIG. 12 is a flow chart depicting a method 1200 for reworking a workpiece such as a fiber resin assembly 400 which may be a carbon fiber assembly 400 according to an implementation of the present teachings. The method 1200 can proceed by operation or use of one or more of the structures depicted in the figures described above, and thus is described with reference to FIGS. 1-9; however, it will be appreciated that the method 1200 is not limited to any particular structure or use unless expressly stated herein. It will be appreciated that while the method 1200 is described as a series of acts or events, the present teachings are not limited by the ordering of such acts or events. Some acts can occur in different orders and/or concurrently with other acts or events apart from those described herein. Further, a method in accordance with the present teachings can include other acts or events that have not been shown for simplicity, while other illustrated acts or events can be removed or modified.

In an implementation, a rework area of a workpiece 400 is processed to define a hole 500 within the workpiece as at 1202. The hole 500 can have a first diameter $D_2$ through a first region (e.g., skin 402) of the workpiece 400 that is larger than a second diameter $D_3$ through a second region 404 (e.g., a carbon fiber laminate 404) of the workpiece. The second region 404 of the workpiece can be formed to define a cant 502. A hole plug 100 is formed, for example, using 3D printing, a molding process, or another suitable process as at 1204. The hole plug 100 can be formed after forming the hole 500 based on measurements of the hole 500, or the hole 500 can be formed to match the dimensions of an existing hole plug 100. The hole plug 100 can include a flange 108 having a third diameter $D_1$ that is smaller than the first diameter $D_2$.

Subsequently, as at 1206, adhesive 600 is applied to grooves 118 of the hole plug 100, and the hole plug 100 is partially inserted into the hole 500 as at 1208. In an example implementation, the hole plug 100 is partially inserted such that a lower edge of nubs 122 around a shank 114 of the hole plug 100 rest on the second region such as the cant 502. With the hole plug 100 partially inserted into the hole, additional adhesive 600 can be applied to the hole plug 100, for example, to a notch 116 as at 1210. The notch 116 and grooves 118 thus provide a carrier for the adhesive 600 as it is inserted into the hole 500, thereby spreading or dispersing a sufficient volume or quantity of the adhesive 600 to other portions of the shank 114 and the workpiece to ensure bonding of the hole plug 100 to the workpiece 400. Next, at 1212, the hole plug 100 is fully inserted into the hole 500. When fully inserted, an upper surface 102 of the hole plug 100 is recessed within an exposed upper surface 700 of the skin 402. Next, at 1214, a vacuum bag 804 is applied to a region 406 of the workpiece 400 including the hole plug 100 and one or more repair layers 800. Subsequently, a vacuum force can be applied to the workpiece 400, the one or more repair layers 800, and the locking hole plug 100 as at 1216. The application of the vacuum force can debulk the one or more repair layers 800 that overlie the workpiece 400 and the locking hole plug 100, as at 1218. At 1220, the adhesive 600 is cured, either passively using a timed cure at ambient temperatures or by performing active processing acts such as heating the adhesive 600, exposing the adhesive to ultraviolet light, etc. Subsequently, additional processing of the region 406 can optionally be performed to complete the rework as at 1222. The rework can include one or more of applying additional layers and adhesives, sanding and/or curing the additional layers 800, applying a vacuum to the additional layer 800 using a vacuum assembly 802, painting or otherwise finishing the workpiece 400. The rework can also optionally include drilling out and removing the hole plug 100 to form a fastening hole 1000, lining the fastening hole 1000 with a liner 1002, and/or other processing acts.

A hole plug according to an example implementation of the present teachings thus provides a structure and technique for reworking a workpiece. The hole plug is secured within a hole defined by the workpiece such that processing of the workpiece can be performed. The processing of the workpiece can include the application of a vacuum force to the rework area during a cure and/or other processing of a repair layer.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for reworking a region of a composite resin assembly having a composite laminate and a skin overlying the composite laminate, the method comprising:
   defining a hole within the region of the composite resin assembly, wherein the hole comprises a first diameter within the skin and a second diameter within the composite laminate, and the first diameter is larger than the second diameter;
   applying an adhesive to a plurality of grooves defined by a shank of a hole plug;
   fully inserting the hole plug into the hole, wherein the hole plug is recessed within the skin;
   curing the adhesive; and
   subsequent to curing the adhesive, completing the reworking of the region.

2. The method of claim 1, wherein the completing of the reworking of the region comprises:
   applying a vacuum bag to the region subsequent to curing the adhesive; and
   applying a vacuum force to the region and to the hole plug.

3. The method of claim 2, wherein the applying of the vacuum force to the region debulks one or more repair layers overlying the hole plug.

4. The method of claim 1, further comprising:
   forming a cant on the composite laminate;
   partially inserting the hole plug into the hole, wherein nubs extending from the shank of the hole plug rest on the cant; and
   applying the adhesive to a notch that encircles the shank of the hole plug.

5. The method of claim 1, wherein the composite resin assembly comprises a carbon fiber assembly.

6. The method of claim 1, wherein the composite laminate comprises one or more carbon fiber layers.

7. The method of claim 1, further comprising forming the hole plug using a 3D printing process or a molding process.

8. The method of claim 1, wherein the hole plug is formed after the hole is formed.

9. The method of claim 8, wherein the hole plug is formed based on measurements of the hole.

10. The method of claim 1, wherein the adhesive is cured using a passive curing process using a timed cure at ambient temperatures.

11. The method of claim 1, wherein the adhesive is cured using an active curing process by exposing the adhesive to ultraviolet light.

12. The method of claim 1, wherein the hole plug comprises:
    a flange having a first diameter, wherein the flange is positioned at a first end of the hole plug;
    a bevel extending from, and intersecting, the flange at an angle;
    a shank extending from the bevel away from the flange to a second end of the hole plug opposite the first end, the shank comprising:
       a second diameter that is smaller than the first diameter; and
       a plurality of longitudinal grooves defined by the shank and oriented around an exterior of the shank; and
    a plurality of nubs positioned on, and extending from, the exterior of the shank, wherein the plurality of nubs are positioned between the plurality of longitudinal grooves.

13. The method of claim 12, wherein the hole plug further comprises:
    the plurality of nubs each comprise a radius; and
    a tangent of each radius parallel to a longitudinal axis of the hole plug intersects the flange within the first diameter.

14. The method of claim 12, wherein the hole plug further comprising a circumferential notch defined by the shank, wherein the circumferential notch is positioned between the plurality of longitudinal grooves and the flange.

15. The method of claim 12, wherein the plurality of nubs each have a first height that is parallel to a longitudinal axis of the hole plug;
    the plurality of longitudinal grooves each have a second height that is parallel to the longitudinal axis of the hole plug and greater than the first height; and
    the plurality of longitudinal grooves are positioned closer to the first end and the second end of the hole plug than the plurality of nubs.

16. The method of claim 15, wherein the second end of the hole plug comprises a chamfered surface.

17. The method of claim 16, wherein the plurality of longitudinal grooves extend into the chamfered surface.

18. The method of claim 12, wherein:
    each nub defines a radius, such that the plurality of nubs define a plurality of radii;
    each radius comprises a tangent that is parallel to a longitudinal axis of the hole plug; and
    each tangent of each radius intersects the flange within the first diameter.

19. The method of claim 12, wherein the hole plug is formed from a single piece of material.

20. The method of claim 19, wherein the hole plug has a surface roughness, wherein an average roughness centerline "$R_a$" of the surface roughness is from 250 microns (μm) to 400 μm.

* * * * *